United States Patent
Frijns et al.

(10) Patent No.: US 8,592,550 B2
(45) Date of Patent: Nov. 26, 2013

(54) PROCESS FOR THE PREPARATION OF POLYCARBONATES

(75) Inventors: Maurice Ludovicus Josephina Frijns, Eindhoven (NL); Robbert Duchateau, Eindhoven (NL); Cornelis Eme Koning, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 299 days.

(21) Appl. No.: 12/988,564

(22) PCT Filed: Apr. 20, 2009

(86) PCT No.: PCT/EP2009/054658
§ 371 (c)(1), (2), (4) Date: Dec. 28, 2010

(87) PCT Pub. No.: WO2009/130182
PCT Pub. Date: Oct. 29, 2009

(65) Prior Publication Data
US 2011/0092643 A1 Apr. 21, 2011

(30) Foreign Application Priority Data

Apr. 21, 2008 (EP) ................................ 0813630

(51) Int. Cl.
*C08G 63/02* (2006.01)
*C08G 64/00* (2006.01)

(52) U.S. Cl.
USPC ............ 528/370; 523/405; 525/409; 525/523

(58) Field of Classification Search
USPC .................. 525/409, 523; 523/405; 528/370
See application file for complete search history.

(56) References Cited

U.S. PATENT DOCUMENTS

| 3,248,415 | A | * | 4/1966 | Stevens ..................... 558/266 |
| 4,826,953 | A | | 5/1989 | Kuyper et al. |
| 7,304,172 | B2 | * | 12/2007 | Coates et al. ..................... 556/1 |
| 2006/0149024 | A1 | | 7/2006 | Ono et al. |
| 2009/0306336 | A1 | | 12/2009 | Luinstra |

FOREIGN PATENT DOCUMENTS

| JP | 34-10646 | 10/1956 |
| JP | 2008-63395 | 3/2008 |
| JP | 2008-081518 | 4/2008 |
| JP | 2008-523181 | 7/2008 |
| JP | 2009-544801 | 12/2009 |
| WO | 2004/111106 | 12/2004 |
| WO | 2006/061237 | 6/2006 |
| WO | 2008/013731 | 1/2008 |

OTHER PUBLICATIONS

International Search Report for PCT/EP2009/054658, mailed Sep. 4, 2009.
Shuying, Y. et al., "Rate of Regulated Copolymerization Involving CO2", Journal of Natural Gas Chemistry, vol. 7, No. 2, (1998), pp. 149-156.
Makito, Y. et al., "Biodegradable Polymers Based on Renewable Resources. VII. Novel Random and Alternating Copolycarbonates from 1,4:3,6-dianhydrohexitols and aliphatic diols", Journal of Polymer Science: Part A: Polymer Chemistry, vol. 41, (2003), pp. 2312-2321.
Letter from Casimir Jones re U.S. Appl. No. 12/988,563 dated Jul. 30, 2013.
Noordover, "*Biobased step-growth polymers—chemistry, functionality and applicability*", Technische Universiteit Eindhoven, 2007, ISBM 978-90-386-1179-2 (Jan. 10, 2008).

* cited by examiner

*Primary Examiner* — Terressa Boykin
(74) *Attorney, Agent, or Firm* — Nixon & Vanderhye P.C.

(57) ABSTRACT

Characterized in that the polymerization is carried out in a single step in the presence of a chain transfer agent. Preferred chain transfer agents are polyols. The invention also relates to branched polycarbonates that have functional hydroxyl endgroups.

9 Claims, 4 Drawing Sheets

PROCESS FOR THE PREPARATION OF POLYCARBONATES

Figure 1:
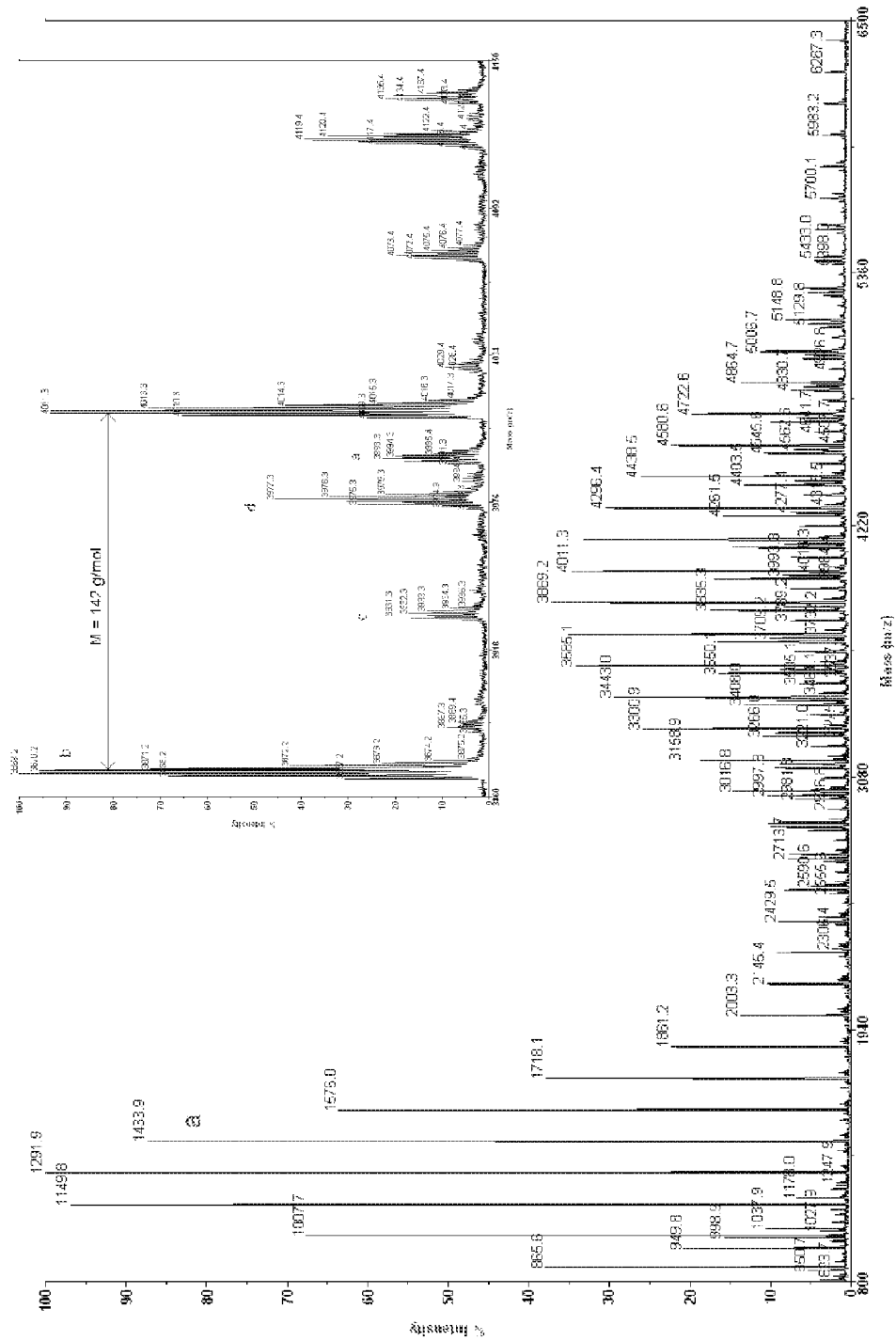

This application is the U.S. national phase of International Application No. PCT/EP2009/054658 filed 20 Apr. 2009, which designated the U.S. and claims priority to EP Application No. 08103630.3 filed 21 Apr. 2008, the entire contents of each of which are hereby incorporated by reference.

The invention relates to a process for the preparation of polycarbonates from oxiranes and $CO_2$.

A process for the preparation of polycarbonates from oxiranes and $CO_2$ is known in the art from Inoue, S.; Koinuma, H.; Tsuruta, T. Polym. Lett. 1969, 7, 287. et al. 1969. This article reports the alternating copolymerization of an oxirane with carbon dioxide, resulting in an aliphatic polycarbonate. This process is a chain growth process which results in a better control of molecular weight. Unfortunately, the nature of these copolymerizations limits the type of backbone to an aliphatic C2 or C3 bridge. Consequently, the physical properties of the polymers can only be improved to a limited extent in order to match the good impact strength, heat resistance and transparency of commercially available poly(bisphenol-A carbonate).

The unique properties of the commercial poly(bisphenol-A carbonate) such as its high Tg and impact resistance are very difficult to obtain with aliphatic polycarbonates based on ethylene oxide (EO), propylene oxide (PO) and cyclohexene oxide (CHO). The first two monomers give polycarbonates with a Tg that is far too low and although the polycarbonate based on CHO has a higher Tg (about 116° C.), it is still considerably lower than the Tg of poly(bisphenol-A carbonate). Polycarbonates with low Tg's, result in sticky products and do not allow the development of for example powder coatings, for which Tg's exceeding 45° C. are required. The Tg of the polycarbonates should be adapted by copolymerization, which enables the production of polycarbonates suitable for either, solvent cast coatings, powder coatings or construction resins.

A further crucial issue for a successful evaluation of polycarbonates as a curable resin is the OH-functionality of the polymer.

From Technical University Eindhoven, 2005 Thesis—ISBN 90-386-2797-1, Meerendonk, Wouter J. van: "$CO_2$ as a Monomer for the Phosgene-free Synthesis of New Polycarbonates" a two-steps process is known for the preparation of hydroxy-functionalized polycarbonates from oxiranes and $CO_2$. For example, poly(cyclohexene carbonate), (PCHC) was prepared by the reaction of cyclohexene oxide with $CO_2$, catalyzed by zinc complexes. The resulting polycarbonates had molecular weights (Mn) between 10000 and 50000 g/mol and Tg's between 115 and 120° C. The synthesized PCHC was subsequently subjected to transesterification in the melt, using low molecular weight diols or polyols. In this way, the high molecular weight polycarbonates are broken down to polycarbonates having molecular weights in the range of 2000-7000 g/mol. These shorter polycarbonate chains now have multiple hydroxyl end-groups, which make them suitable for curing with, for example, conventional polyisocyanate cross-linkers. Following this method, the previously prepared polycarbonates were broken down to polycarbonate resins with Mn values between 1000 and 4000 g/mol. These resins mainly had hydroxyl end-groups, as was determined by titration. When using polyols to break down the high molecular polycarbonates, the functionality was increased and branched polycarbonate chains were obtained. A disadvantage of this process is however the 2 step process in which first high molecular weight polycarbonates are being prepared and second (subsequently) these high molecular weight polycarbonates have to be broken down to achieve shorter polycarbonate chains having multiple hydroxyl-end groups, which make the polycarbonates suitable for curing.

Polycarbonates having reactive hydroxyl-end groups are known from WO-A-2006/089940. WO-A-2006/089940 describes the production of hyperbranched polycarbonates from phosgene, diphosgene or triphosgene and aliphatic, aliphatic/aromatic and aromatic diols or polyols. A disadvantage of this process is that the polycarbonates are produced from phosgene instead of from renewable monomers. This route is environmentally undesirable due to the need of the hazardous monomers as dichloromethane and phosgene, and due to the production of large amounts of NaCl as a side product. The obtained polycarbonates further have very low molecular weights and low Tg's, which make them not applicable to any applications where reasonable mechanical properties are needed, or where a Tg above room temperature is required.

The aim of the present invention is to develop a simple single step process for the preparation of polycarbonate from oxiranes and optionally oxetanes and $CO_2$. The polycarbonate may have a predefined molecular weight and at least two curable functional groups. Examples of functional groups are —OH, —NH, —SH, —PH, —COOH, POH. A preferred example of a functional group is a —OH group. A further aim of the present invention is to provide polycarbonates having simultaneously a sufficiently high glass transition temperature and reactive OH-end groups.

This aim is achieved in that the polymerization process is carried out in a single step in the presence of a difunctional chain transfer agent.

An advantage in the process of the present invention is that it is possible to develop a simplified process to provide simultaneously low molecular weight and OH-functionalized polycarbonates. A further advantage of the present invention is that the aliphatic polycarbonates are produced at least partly from renewable resources via an environmental friendly route.

A still further advantage is that the presence of multiple hydroxyl functional groups in the aliphatic carbonates obtained in the process of the present invention gives a number of advantages, like for example enhanced functionality, improved coating properties due to higher cross-link density, better mechanical performance and better chemical resistances for solvents and stains. Moreover better adhesion to metals may be achieved if some free OH-groups are present in a final film and also properties like Tg, melt viscosity and shear thinning behavior may be tuned by controlling the degree of branching. When increasing the degree of branching, the melt viscosity and melt strength increase, which can be advantageous for blow molding of the polycarbonate of the present invention in combination with other polymers. The shear thinning tendency also increases with increasing degree of branching, which can be favorable for processing techniques such as extrusion and injection molding.

The polymerization reaction applied in the present invention is a chain reaction known to the person skilled in the art which consists essentially of the following steps: chain initiation, chain growth, chain transfer and chain termination. Chain initiation takes place by means of a catalyst initiator. For a controlled chain termination a chain transfer agent may be applied. Chain transfer agents used in the present invention have at least two active protons which facilitates the chain transfer reaction. Examples of chain transfer agents include alcohols, carboxylic acids or esters, thiols, amines and compounds having a —POH or —PH group.

Chain transfer agents that have only one active proton can be present during the polymerization reaction.

Examples of alcohols are aliphatic diols, ether diols, aromatic diols or polyols. Examples of aliphatic diols are 1,2-propane-diol, 1,3-propanediol, ethylene glycol, diethyleneglycol, propyleneglycol, 1,2-butanediol, 1,3-butanediol, 1,4-butanediol, 2,3-butanediol, 1,5-pentanediol, neopentyl glycol, 1,6-hexanediol, 2,5-hexane-diol, 1,7-heptanediol, 1,8-octanediol, 1,9-nonanediol, the hydroxy pivalic ester of neopentyl glycol, butylethylpropane diol and ethylmethylpropane diol. The amount of diols used in the process of the present invention range between 0.01 and 90 wt %, preferably between 0.1 and 70 wt %, more preferably between 0.5 and 40 wt %. When the polycarbonates obtained according to the process of the present invention are used in applications like powder coatings, where a Tg above room temperature is preferred, the amount of diol preferably ranges between 1 and 30 wt %.

Examples of ether diols are bicyclic ether diol as expressed by formula (1). The bicyclic ether diols can be easily prepared from renewable resources, for example, polysaccharide, starch or the like. These ether diols have three kinds of stereo isomers. In concrete terms, they are 1,4:3,6-dianhydro-D-sorbitol (hereafter, this compound will be referred as to "isosorbide" in this description) expressed by the following formula (2), 1,4:3,6-dianhydro-D-mannitol (hereafter, this compound will be referred as to "isomannide" in this description) expressed by the following formula (3), and 1,4:3,6-dianhydro-L-iditol (hereafter, this compound will be referred as to "isoidide" in this description) expressed by the following formula (4).

Formula 1

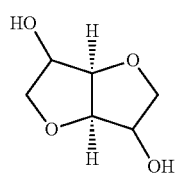

Formula 2

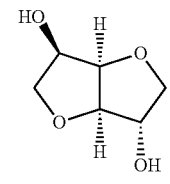

Formula 3

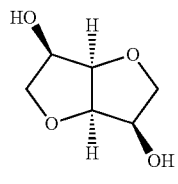

Formula 4

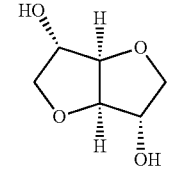

Other examples of possible ether diols, diols or polyols include alkanols, monoalkyl ethers of polyoxyalkyleneglycols, monoalkyl ethers of alkyleneglycols, alkylene and arylalkylene glycols. Examples are 1,2,4-butanetriol, 1,2,6-hexanetriol, 1,2,3-heptanetriol, 2,6-dimethyl-1,2,6-hexanetriol, (2R,3R)-(−)-2-benzyloxy-1,3,4-butanetriol, 1,2,3-hexanetriol, 1,2,3-butanetriol, 3-methyl-1,3,5-pentanetriol, 1,2,3-cyclohexanetriol, 1,3,5-cyclohexanetriol, 3,7,11,15-tetramethyl-1,2,3-hexadecanetriol, 2-hydroxymethyltetrahydropyran-3,4,5-triol, 2,2,4,4-tetramethyl-1,3-cyclobutanediol, 1,3-cyclopentanediol, trans-1,2-cyclooctanediol, 1,16-hexadecanediol, 3,6-dithia-1,8-octanediol, 2-butyne-1,4-diol, 1-phenyl-1,2-ethanediol, 1,2-cyclohexanediol, 1,5-decalindiol, 2,5-dimethyl-3-hexyne-2,5-diol, 2,7-dimethyl-3,5-octadiyne-2-7-diol, 2,3-butanediol, 1,4-cyclohexanedimethanol, polyoxyethylene and polyoxypropylene glycols and triols of molecular weights from about 200 to about 10,000, polytetramethylene glycols of varying molecular weight, poly(oxyethylene-oxybutylene) random or block copolymers, copolymers containing pendant hydroxy groups formed by hydrolysis or partial hydrolysis of vinyl acetate copolymers, polyvinylacetal resins containing pendant hydroxyl groups; hydroxy-functional (e.g. hydroxy-terminated) polyesters and hydroxy-functional (e.g. hydroxy-terminated) polylactones, polycarbonate polyols (e.g. an polycarbonate diol), hydroxy-functional (e.g. hydroxy-terminated) polyethers (e.g. polytetrahydrofuran polyols having a number average molecular weight in the range of 150-4000 g/mol, 150-1500 g/mol, or 150-750 g/mol), and combinations thereof.

Examples of aromatic diols include dimethanolbenzene, bisphenol A or diethanolbenzene.

Examples of polyols are aliphatic compounds having between 2 and 6 hydroxy groups. In a preferred embodiment the aliphatic compound is a mixture of at least two different polyols, containing a polyol having 2 hydroxy groups (a diol compound) and a polyol containing between 3 and 6 hydroxyl groups (a polyol (3-6)). It is most preferred that the polyol compound comprises at least one diol and at least one triol compound (a compound having 3 OH groups). The use of mixtures of diols and polyols (3-6), like for example triols, renders polycarbonates having branched structures and a plurality of hydroxyl functionalities. Examples of polyols (3-6) include trimethylolpropane, trimethylol ethane, glycerol, pentaerythritol, dipentaerythritol, hexanetriol, 1,3,5-cyclohexanetriol, sorbitol, sucrose, and tris-(2-hydroxyethyl)-isocyanurate or the like and the polyols having 3-6 OH groups which are extended with one or more ethyleneoxide or propyleneoxide units.

Preferred polyols (3-6) are chosen from the group consisting of trimethylolpropane, trimethylolethane, pentaerythritol, 1,3,5-cyclohexanetriol, glycerol and sorbitol.

The molecular weight of the polyol preferably is between 50 and 250 g/mol.

The amount of polyols (3-6) ranges between 0-7 wt %, more preferably between 1 and 6 wt %.

The weight ratio diols to polyols (3-6) ranges between 4 and 50, more preferably between 5 and 20 or between 6 and 17.

Examples of thiols are thiophenol, n-butyl thiol or dodecyl thiol, C4-C18-alkyl mercaptans, such as n-hexyl mercaptan, n-octyl mercaptan, tert-octyl mercaptan, n-decyl mercaptan, n-dodecyl mercaptan, tert-dodecyl mercaptan, n-hexyldecyl mercaptan and stearyl mercaptan, mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, mono-, bis- and tris-S-acetyl-pentaerythritol tetra-3-mercaptopropionate; mono-, bis-, and tris-S-acetoacetyl-pentaerythritol tetra-3-mercaptopropionate; mono- and bis-S-acetoacetyl-trimethylolpropane tri-3-mercaptopropionate;

mono- and bis-S-acetyltrimethylolpropane tri-3-mercaptopropionate; 1-(S-acetyl-3-mercaptopropoxy)-3-mercapto-2-acetoxypropane; and 1-(S-acetyl-3-mercaptopropoxy)-3-mercapto-2-hydroxypropane. Examples of acids which may be used as chain transfer agent are succinic acid, formic acid, 2,5-cyclohexadiene-1-carboxylic acid, 1-isopropyl-2,5-cyclohexadiene-1-carboxylic acid, 1-tert-butyl-2,5-cyclohexadiene-1-carboxylic acid, 1-benzyl-2,5-cyclohexadiene-1-carboxylic acid, 1-allyl-2,5-cyclohexadiene-1-carboxylic acid, 1-cyanomethyl-2,5-cyclohexadiene-1-carboxylic acid, 1-methyl-2,5-cyclohexadiene-1-carboxylic acid, 2,4-cyclohexadiene-1-carboxylic acid, 1-methyl-2,4-cyclohexadiene-1-carboxylic acid, 2,5-dihydrofuran-2-carboxylic acid, 2-methyl-2,5-dihydrofuran-2-carboxylic acid, 2H-pyridine-1-carboxylic acid, 4H-pyridine-1-carboxylic acid, The chain transfer agent may also comprise compounds with a P—OH or P—H bond, for example hypophosphorous acid or salts, (such as an alkali metal salt or ammonium salt) of said acid, or primary or secundary phosphines.

Preferred chains transfer agents are polyols or carboxylic acids. Most preferred chains transfer agents are polyols having from 2 to 6 OH groups.

The above chain transfer agents may be used either alone respectively or in combinations with each other. The various chain transfer agents can of course be added at the same time, or else at different times.

According to the present invention, the chain transfer agent may be added continuously over the course of the polymerization reaction. In addition, an initial charge of the chain transfer agent in the polymerization vessel is possible. Preference is given to combining the two processes by initially introducing some of the chain transfer agent, which will usually not exceed 20% of the total amount of chain transfer agent into the polymerization vessel, particularly when monomers are also initially introduced into the polymerization vessel. Preferably, the chain transfer agent is added in parallel to the monomer, i.e. the majority, in particular at least 80% and particularly preferably the total amount, of the chain transfer agent is added over a period in which the monomers of the polymerization reaction to be polymerized are also introduced. In this connection, it has proven useful in particular if the chain transfer agent is introduced into the polymerization reaction together with the monomers. The chain transfer agent can of course also be added via a separate feed.

In a further embodiment, the metered addition of the chain transfer agent takes place over so-called ramps and stages, i.e. in procedures in which the addition of regulator is started later than the monomer feed, or ends earlier than said feed.

According to the invention, it is also possible that the concentration of the chain transfer agent system changes during the addition according to said variations. Preference is given to starting with relatively high chain transfer agent concentrations which decrease over the course of the polymerization reaction.

The presence of multiple hydroxyl functional groups in the polycarbonate of the present invention gives a number of advantages, like for example enhanced functionality, improved coating properties due to higher cross-link density such as better mechanical performance and better chemical resistances for solvents and stains, better adhesion to metals (if some free OH-groups are present in the final film), possibility of tuning Tg, melt viscosity and shear thinning behavior by controlling the degree of branching. When increasing the degree of branching, the melt viscosity and melt strength increase, which can be advantageous for blow molding purposes. The shear thinning tendency also increases with increasing degree of branching, which can be favorable for processing techniques such as extrusion and injection moulding.

The oxiranes, used in the process of the present invention are also known as epoxides, which are three-membered cyclic ethers. Examples of epoxides suitable in the present invention are ethylene oxide, propyleneoxide, isobutyleneoxide, 2-buteneoxide, cyclohexene oxide (CHO), cyclopentene oxide (CPO), styrene oxide, allyl glycidyl ether (AGE), isobutyl glycidyl ether, limonene oxide, isoprene oxide, 4-vinyl cyclohexene oxide.

Preferred epoxide is cyclohexene oxide (CHO), because it is one of the most reactive and easily handled epoxide. Other examples of suitable epoxides are aliphatic or aromatic epoxides. Examples of aliphatic epoxides include glycidyl ethers of $C_2$-$C_{30}$ alkyls; 1,2 epoxides of $C_3$-$C_{30}$ alkyls; mono and multi glycidyl ethers of aliphatic alcohols and polyols such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols and polyols. In one embodiment, it is preferred that the aliphatic epoxides comprise one or more cycloaliphatic ring structures. For instance, the aliphatic epoxides may have one or more cyclohexene oxide structures, e.g. two cyclohexene oxide structures. Examples of aliphatic epoxides comprising a ring structure include hydrogenated bisphenol A diglycidyl ethers, hydrogenated bisphenol F diglycidyl ethers, hydrogenated bisphenol S diglycidyl ethers, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl)hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl)ether, and 2-(3,4-epoxycyclohexyl-5,5-spiro-3,4-epoxy)cyclohexane-1,3-dioxane.

Examples of aromatic epoxides include aromatic epoxides derived from a polyphenol, e.g. from bisphenols such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, or 4,4'-(9-fluorenylidene)diphenol. The bisphenols may be alkoxylated (e.g. ethoxylated and/or propoxylated) and/or halogenated (e.g. brominated). Examples of bisphenol epoxides include bisphenol diglycidyl ethers.

Further examples of aromatic epoxides include triphenylolmethane triglycidyl ether, 1,1,1-tris(p-hydroxyphenyl) ethane triglycidyl ether, and aromatic epoxides derived from a monophenol, e.g. from resorcinol (for instance resorcin diglycidyl ether) or hydroquinone (for instance hydroquinone diglycidyl ether). Another example is nonylphenyl glycidyl ether.

In addition, examples of aromatic epoxides include epoxy novolacs, for instance phenol epoxy novolacs and cresol epoxy novolacs. Commercial examples of cresol epoxy novolacs include, e.g., EPICLON N-660, N-665, N-667, N-670, N-673, N-680, N-690, and N-695, manufactured by Dainippon Ink and Chemicals, Inc. Examples of phenol epoxy novolacs include, e.g., EPICLON N-740, N-770, N-775, and N-865.

The amount of oxirane ranges between 50 and 99 wt % of the total mixture, preferably between 60 and 98 wt %, or between 70 and 95 wt %

The process of the present invention may also apply oxetanes as monomer in addition to the oxiranes mentioned. Oxetanes are heterocyclic organic compounds having a four-membered ring with three carbon atoms and one oxygen atom with the molecular formula $C_3H_6O$. The term oxetane in the present invention refers more generally to any organic compound containing an oxetane ring. Specific examples of compounds having one oxetane ring are 3-ethyl-3-hydroxymethyloxetane, 3-(meth)-allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl) ether, 2-ethylhexyl(3-ethyl-3-oxetanylmethyl)ether, ethyldiethylene glycol (3-ethyl-3-oxetanylmethyl)ether dicyclopentadiene (3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether tribromophenyl(3-ethyl-3-oxetanylmethyl)ether, 2-tribromophenoxyethyl(3-ethyl-3-oxetanylmethyl)ether 2-hydroxyethyl(3-ethyl-3-oxetanylmethyl)ether, 2-hydroxypropyl(3-ethyl-3-oxetanylmethyl)ether, butoxyethyl (3-ethyl-3-oxetanylmethyl)ether, pentachlorophenyl(3-ethyl-3-oxetanylmethyl)ether, pentabromophenyl(3-ethyl-3-oxetanylmethyl)ether, bornyl(3-ethyl-3-oxetanylmethyl) ether.

Typical examples of compounds having two or more oxetane rings are 3,7-bis(3-oxetanyl)-5-oxa-nonane, 3,3'-(1,3-(2-methylenyl)propanediylbis(oxymethylene))-bis-(3-ethyloxetane), 1,4-bis[(3-ethyl-3-oxetanylmethoxy)methyl] benzene, 1,2-bis[(3-ethyl-3-oxetanylmethoxy)methyl] ethane, 1,3-bis[(3-ethyl-3-oxetanylmethoxy)methyl] propane, ethylene glycol bis(3-ethyl-3-oxetanylmethyl) ether, dicyclopentenylbis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene bis(3-ethyl-3-oxetanylmethyl)ether, trimethylolpropane tris(3-ethyl-3-oxetanylmethyl)ether, 1,4-bis(3-ethyl-3-oxetanylmethyl)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl), ether, dipentaerythritol pentakis(3-ethyl-3-oxetanylmethyl)ether, dipentaerythritol tetrakis(3-ethyl-3-oxetanylmethyl)ether, caprolactone modified dipentaerythritol hexakis(3-ethyl-3-oxetanylmethyl)ether, caprolactone modified dipentaerythritol pentakis(3-ethyl-3-oxetanylmethyl)ether, ditrimethylolpropane tetrakis(3-ethyl-3-oxetanylmethyl)ether, ethyleneoxide modified bisphenol A bis(3-ethyl-3-oxetanylmethyl)ether, propylene oxide modified bisphenol A bis(3-ethyl-3-oxetanylmethyl)ether, ethylene oxide modified hydrogenated bisphenol A bis(3-ethyl-3-oxetanylmethyl)ether, propylene oxide modified hydrogenated bis(3-ethyl-3-oxetanylmethyl)ether, ethylene oxide modified bisphenol F bis(3-ethyl-3-oxetanylmethyl) ether.

Carbon dioxide is a renewable resource, therefore the polymerization process of the present invention in which carbon dioxide is incorporated into the polymer can be regarded as green chemistry. Moreover carbon dioxide is generally considered as a green, environmentally benign solvent and reactant that is readily available, cheap, non-flammable, non-toxic and renewable. With the growing concern about the environmental impact of chemical substances, carbon dioxide has received increasing attention as a potential carbon source in industrial chemical processes. Use of carbon dioxide may result in more economical and/or efficient routes.

Several catalysts may be used for the copolymerization of oxiranes with $CO_2$. For example zinc, aluminum, chromium, cobalt, manganese, scandium, yttrium, lanthanides, actinides and magnesium based catalyst systems. More specific examples of these catalysts are disclosed in Meerendonk, Wouter J. van. from Technical University Eindhoven, 2005 Thesis—ISBN 90-386-2797-1: "$CO_2$ as a Monomer for the Phosgene-free Synthesis of New Polycarbonates" a two-steps process is known for the preparation of hydroxy-functionalized polycarbonates from oxiranes and $CO_2$. Examples of catalysts can also be found in D. J. Darensbourg et al, Chem Rev (2007), 107, 2388-2410 or G. W. Coates et al, Angew Chemie Int Ed (2004), 43, 6618.

The temperature of the polymerization reaction will depend on the choice of initiator, and target molecular weight. Generally, the temperature of the polymerization is up to the boiling point of the system although the polymerization can be conducted under pressure if higher temperatures are used. Preferably, the temperature of the polymerization is from about 25 to about 110° C., and most preferably from 50 to 80° C.

The polycarbonates obtained by the process of the present invention are OH-functionalized. Preferably the polycarbonate comprises between 0.3 and 2 mmol hydroxyl groups per gram of polymer, more preferably between 0.4 and 1.5 mmol hydroxyl groups per gram of polymer The number of hydroxyl groups is determined with potentiometric titration as defined in the experimental section. The molecular weight of the polycarbonate preferably ranges between 500 and 25,000 g/mol (number average molecular weight), more preferably between 750 and 10,000, most preferably between 1000 and 5000.

The glass transition temperature (as determined with DSC) of the polycarbonates of the present invention range from −10 to 180° C., preferably from 0 to 150° C., more preferably between 45 and 100° C.

An important advantage of the polycarbonates obtained by the process of the present invention is that they have hydroxyl functional groups. The hydroxyl functional groups can be crosslinked with for example polyisocyanates (having free or blocked-NCO groups), which leads to poly(carbonate urethane) networks. Alternatively, the hydroxyl groups can be used for chain extension or blockcopolymerisation of the polycarbonates. For example the OH-functional polycarbonate can be endcapped with for example diisocyanates (reagents based on HMDI, isphorone diisocyanate, etc), yielding NCO-functionalized polycarbonates. These can be used for example as polyurethane latex. The NCO-functionalized polycarbonates can be reacted with for example (crystallizable) diamine blocks (forming poly(carbonate urea)s, polyamine (like for example melamine, forming cross-linked poly(carbonate urea)s) and/or polyols.

In general such a NCO-functional oligo- or polycarbonate can be used as an amorphous resin. In a different embodiment of the present invention the linear or branched OH-functional polycarbonates obtained by the process of the present invention can be reacted as such with a diisocyanate to yield chain extended poly(carbonate urethanes), branched or cross-linked, having a high molecular weight. It is also possible to react the hydroxyl functional polycarbonates with carboxylic acid/anhydride containing moieties, capable of forming anhydrides at the chain end (for example citric acid, 1,2,3-propanetricarbyxylic acid, trimellitic anhydride etc). The anhydride functionalized polycarbonates can be cured with di- or polyamines, polyalcohols and (poly)epoxides.

The reaction of the polycarbonates obtained by the process of the present invention with isocyanate-functional polymers yields novel block-copolymers. Reaction of the polycarbonates with cross-linking agents like polyisocyanates yields a three dimensional object, a coating or a film which has a high impact resistance (tough material), hardness, excellent transparency, chemical resistivity and good appearance with respect to color and gloss. Also, the polycarbonate coatings have good UV-stability.

The hydroxyl functional groups can also be converted to other functional groups. For example they can be reacted with acrylic acid chloride or methacrylic acid chloride to form a polycarbonate resin with UV-curable unsaturated end-groups. Acid/anhydride functional polycarbonates can be obtained by reacting OH-functional polycarbonate resins (with Tg=35-100° C.) in the melt with for example citric acid (biobased polyfunctional monomer) or succinic anhydride at 150-160° C. These can be further reacted with for example epoxy curing agents such as TGIC, triglycidyl trimellitate and diglycidyl terephthalate. In combination with high Tg polycarbonate resins (Tg>90° C.), epoxydised linseed oil (ELO) can be used to cure the system. Also, β-hydroxyalkylamides having activated OH-groups can be used to cross-link acid- or anhydride-functional polycarbonates. These reactions will lead to poly(carbonate ester) networks.

The polycarbonates obtained by the process of the present invention have a number of advantages over regular aromatic polycarbonates or aliphatic polyester resins. The polycarbonates are (mainly) aliphatic systems, have a good UV-stability, they are bio-based materials, have a tuneable Tg, tuneable melt viscosity, tuneable degree of cross-linking by a proper choice of co-monomers, ratio of monomers and choice of molecular weight of the polycarbonate. They show improved hydrolytic stability, improved toughness and transparency.

Further, to the process of the present invention various function-imparting agents may optionally be added depending on the use of the polycarbonates. Such agents are, for example, heat stabilizers, stabilization adjuvants, plasticizers, antioxidants, photo stabilizers, nucleating agents, heavy metal-inactivating agents, flame retardants, lubricants, antistatic agents, ultraviolet absorbers, antifoaming agents, pigments etc.

Further, depending on the use, the polycarbonates obtained by the process of the present invention may optionally be compounded with various organic or inorganic pigments, fillers, fibres' etc. Examples of fillers are carbon, talc, montmorillonite, hydrotalcite. Examples of fibers are various synthetic fibres', glass fibres, quartz fibres' or carbon fibres in addition to natural fibres such as kenaf.

By virtue of degradability, the polycarbonates obtained by the process of the present invention can be used as films and sheets for agricultural materials including green house films, mulch films etc., packaging films and sheets for uses including food wrapping, general packaging, compost bags etc., industrial materials including tapes etc., various packaging containers etc. and moulded articles for various uses in which the prevention of environmental contamination are needed.

Further, the polycarbonates obtained by the process of the present invention can be used after they are mixed and alloyed with a bio-based polymer, a synthetic resin, a rubber or the like of various types, for example, an aromatic polyester, an aromatic polycarbonate, a polyamide, polystyrene, a polyolefin, polyacrylic resin, ABS, a polyurethane etc. in addition to polylactic acid and an aliphatic polyester.

The polycarbonates obtained by the process of the present invention can be used in a number of different applications, like for example coating formulations (powder coatings and solvent or water borne systems), polyols for copolymer synthesis, construction resins, adhesives, inks, composites, molding compounds, sheets and glazings, films, elastomers, as flow agent or as a filler in polymeric systems.

The present invention also relates to articles made with the polycarbonates obtained by the process of the present invention. Such articles can be for example construction resins, blow-moulded objects and extrusion moulded objects.

The polycarbonates obtained by the process of the present invention can be used in coating applications like powder coatings, solvent or water borne coating compositions. Use in powder coatings is advantageous because of the sufficiently high Tg and OH-functionality, good flow, good UV and hydrolytic stability. Also excellent results can be achieved in solvent or in water borne systems.

A powder coating composition comprises at least one resin and at least one crosslinker. With powder coating composition is here and hereinafter meant a solid composition that is suitable for application as a powder onto a substrate. With solid is here and hereinafter meant a compound that is solid at room temperature at atmospheric pressure. The glass temperature (Tg) of the powder coating composition lies at or above 30° C. Preferably the Tg lies above 35° C., more preferably above 45° C. The Tg is determined by differential scanning calorimetry (DSC) at a heating rate of 10° C./min.

The crosslinker present in the powder coating composition is not particularly critical. The nature of the crosslinker is determined by the nature of the functional groups in the resin. The functional groups on the crosslinker must be able to react with the functional groups in the resin. Examples of crosslinkers are epoxy resins, polyamines, isocyanates, amino resins, polycarboxylic acids, acid anhydrides, polyphenols, Primid(R)-like compounds and combinations of any of them. Depending on the nature of the functional groups in the resin, the crosslinker will be chosen so as to react with the functional groups of the resin. The composition comprising at least the resin and the crosslinker will be cured. This curing process is well known to the man skilled in the art of making coatings. Examples of curing processes are thermal curing, curing with electromagnetic radiation, such as for example UV- or electron beam curing. Depending on the nature of the functional groups it is also possible to use two (dual-cure) or more types of curing processes.

A pigment or dye may be present in the powder coating composition. The pigment can be of an inorganic or organic nature. With pigment is meant here and hereinafter a substance consisting of particles, which is practically insoluble in the binder and is used as a colorant (DIN 55943). A colorant is a colour-imparting substance. With binder is meant the combination of resin and crosslinker. Pigments suitable for use in the coating composition according to the invention and in the powder coating composition are for example white pigments, coloured pigments, black pigments, special effect pigments and fluorescent pigments. Generally the pigment can be present in a coating composition and more specifically in a powder coating composition in an amount of 1-50 w/w %.

Additionally other components can be added to the powder coating composition, for example flow control agents, catalysts, fillers, light-stabilizers, biocides, and degassing agents.

The characteristics may be achieved after a curing time between for example 1 and 15 minutes at a temperature between for example 135° C. and 250° C.

Preferably, the groups of the crosslinker which are capable of reacting with hydroxyl groups are isocyanate groups. The isocyanate functionality of the crosslinker is preferably equal or higher than 2 and is more preferably between 2 and 6.

The atoms of the crosslinker, having isocyanate units and having an aliphatic chain with more than 6 atoms, may be for example carbon atoms, nitrogen atoms, sulphur atoms, oxygen atoms and/or phosphorous atoms. Preferably the atoms are carbon atoms. The amount of carbon atoms in the aliphatic chain between the isocyanate groups of the crosslinker is preferably higher than 6 and may be less than for example 30 carbon atoms. Preferably the amount of carbon atoms is 8 or higher and more preferably 9 or higher.

Preferably the crosslinker is a blocked crosslinker because the isocyanate in the crosslinker must be protected in order to avoid the crosslinking reaction at room temperature and to provide good storage stability of the coating. A suitable blocking agent may be selected, for example, from the group consisting of caprolactam, imidazol, triazole, benzotriazole, pyrazole, oxime such as for example acetoxyoxime, ethyl acetoacetate, hydroxylamine, imide, N-hydroxylimide, phenol, cyclohexanol and malonic acid ester.

Suitable crosslinkers are for example: caprolactam blocked diisocyanates and triisocyanates, for example, 1,12-diisocyanatododecane, 1,8-diisocyanatodooctane, 1,8-diisocyanato(4-isocyanatomethyl)octane, 1,9-diisocyanatononane, 1,10-diisocyanatodecane, 1,11-diisocyanatoundecane trisisocyanate, 1,11-diisocyanato(3,6,9-trioxy) undecane and/or trisisocyanate.

As mentioned before, the polycarbonates obtained by the process of the invention can also be applied in water borne systems or in solvent borne systems. Such systems can for example comprise the OH functional polycarbonate of the invention, a polyol resin (like for example a polyacrylate, a polyester or a polyurethane resin), and an organic polyisocyanate as crosslinker. The polyacrylate is for example a resin obtainable by grafting a composition of unsaturated monomers onto a partially unsaturated hydroxyl functional polyester resin. The organic polyisocyanate includes hydrophobic polyfunctional, preferably free polyisocyanates with an average NCO functionality of more than 2, preferably 2.5 to 5, and may be (cyclo)aliphatic, araliphatic or aromatic in nature.

Preferably, the polyisocyanate has a viscosity at 22° C. of 0.1 to 5 Pa·s The polyisocyanate may include biuret, urethane, uretdione, and isocyanurate derivatives. Examples of a polyisocyanate include 1,6-hexane diisocyanate, 2,4-toluene diisocyanate, 2,6-toluene diisocyanate, diphenyl methane-diisocyanate, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-α,α-α',α'-tetramethyl xylylene diisocyanate, 1,8-diisocyanato-4-(isocyanatomethyl)octane, isophorone diisocyanate or bis(isocyanate cyclohexyl)methane, and the above-mentioned derivatives thereof and mixtures thereof. Normally, these products are liquid at ambient temperature and commercially available in a wide range.

Preferred are cyclic trimers (isocyanurates) of 1,6-hexane diisocyanate and isophorone diisocyanate. Usually these compounds contain small quantities of their higher homologues. Also, isocyanate adducts may be used. Examples thereof are the adduct of 3 moles of toluene diisocyanate to 1 mole of trimethylol propane, the adduct of 3 moles of m-α,α-α',α',-tetramethyl xylene diisocyanate to 1 mole of trimethylol propane. Optionally, a hydrophilic polyisocyanate may be partially substituted for the hydrophobic polyisocyanate. Such a hydrophillic polyisocyanate may be a polyisocyanate compound substituted with non-ionic groups, such as the above-mentioned C1-C4 alkoxy polyalkylene oxide groups. Preferably 1 to 30 wt. % of non-ionic groups will be present on the total solid polyisocyanate compound, i.e. the organic, hydrophobic, and hydrophilic polyisocyanate, more preferably 2 to 20 wt. %, most preferably 5 to 15 wt. %. Preferred are the isocyanurates of 1,6-hexane diisocyanate and isophorone diisocyanate substituted with methoxypolyethylene glycol.

A water borne composition may also contain reactive diluents such as water-soluble mono- or (preferably) polyhydric alcohols. Examples of monohydric alcohols include hexyl glycol, butyoxy-ethanol, 1-methoxy-propanol-2, 1-ethoxy-propanol-2, 1-propoxypropanol-2, 1-butoxy-propanol-2,2-methoxybutanol, 1-isobutoxy-propanol-2, dipropylene glycol monomethyl ether, diacetone alcohol, methanol, ethanol, propanol, isopropanol, butanol, 2-butanol, pentanol, hexanol, benzyl alcohol, and mixtures thereof. Examples of polyhydric alcohols include ethylene glycol, diethylene glycol, propylene glycol, isomeric butane diols, the polyethylene oxide glycols or polypropylene oxide glycols, trimethylol propane, pentaerythritol, glycerol, and mixtures thereof.

A water borne composition comprising the polycarbonate obtained by the process of the present invention comprises a solvent/dispersant that consists essentially of water, being an aqueous composition. However, about 20 wt. % of liquid content of the composition may be an organic solvent. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxyethyl propionate, toluene, xylene, methylethyl ketone, methylisobutyl ketone, methylamyl ketone, ethylamyl ketone, dioxolane, N-methyl-2-pyrrolidone, dimethyl carbonate, propylene carbonate, butyrolactone, caprolactone, and mixtures thereof.

The polymers obtained by the processes of the present invention may be used in for example, coatings or paints for automobiles and other vehicles, in construction resins, as reactive filler, as a building block for copolymers, in mixtures with engineering plastics but also in the fields of imaging, electronics (e.g., photoresists), engineering plastics, adhesives, and sealants.

The present invention is illustrated by the following non-limiting examples and comparative experiments.

FIGURE LEGENDS

FIG. 1: Graph representing the MALDI-ToF-MS spectrum of Experiment 1.

Figure 2:
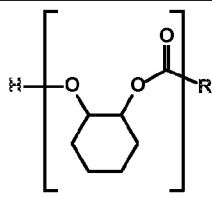

FIG. 2: Structural formula of the labeled peaks shown in FIG. 1.

Figure 3:
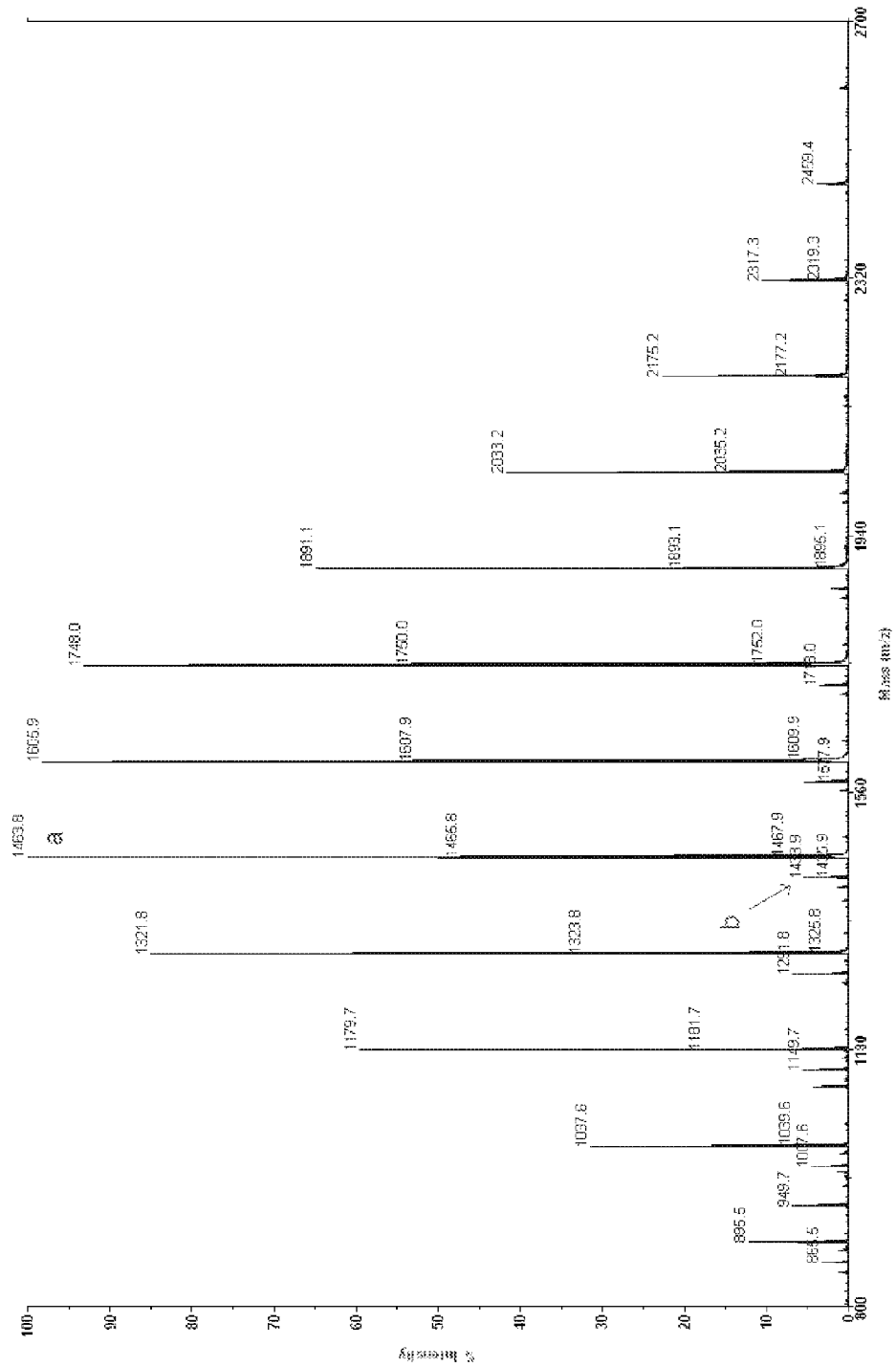

FIG. 3: MALDI-ToF-MS spectrum of the experiment using isoidide (example 2)

Figure 4:
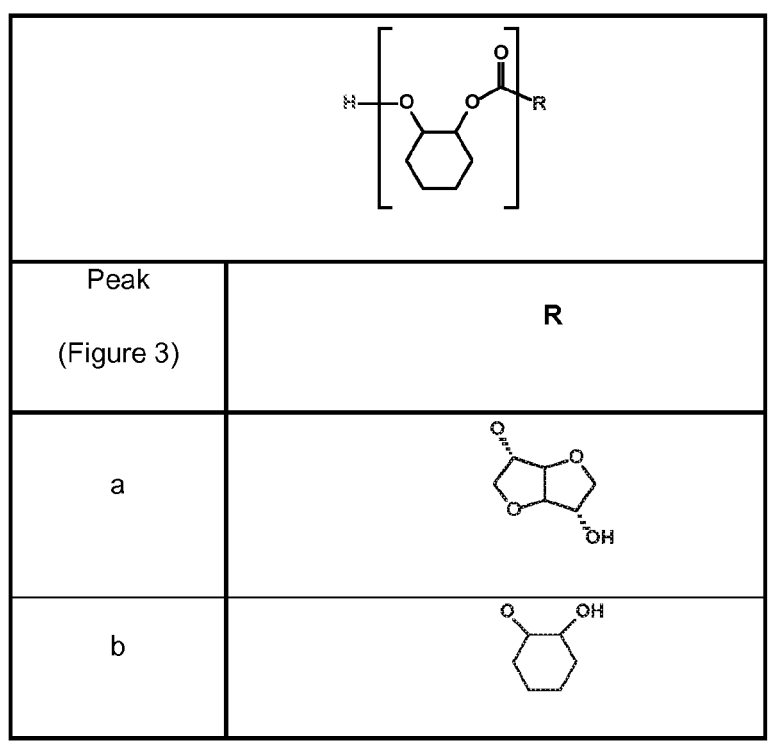

FIG. 4: Structural formula of the labeled peaks shown in FIG. 3.

EXAMPLES

Materials:
Cyclohexene oxide (98%) (CHO, Acros) was distilled over $CaH_2$ prior to use. Ethanol (Biosolve) was dried over molecular sieves and degasses prior to use.

(+)-Limonene oxide (LO, 97%, mixture of cis and trans, Aldrich) was distilled over $CaH_2$ prior to use. Toluene (Merck) was dried over alumina in a Grubbs-type drying column and stored on molecular sieves prior to use Commercial carbon dioxide (>99.9993% pure, Hoek Loos), 4-dimethylaminopyridine (DMAP, Aldrich), isoidide (99.8%, Roquette Frères), 1,4-benzenedimethanol (Aldrich) were all used as received. Catalysts 1-4 were synthesized according to literature [1-3].

[1] C. T. Cohen, C. M. Thomas, K. L. Peretti, E. B. Lobkovsky and G. W. Coates, *Dalton Trans.*, 2005, 237-249

[2] M. Cheng, D. R. Moore, J. J. Reczek, B. M. Chamberlain, E. B. Lobkovsky and G. W. Coates, *J. Am. Chem. Soc.*, 2001, 123, 8738-8749

[3] D. J. Darensbourg, R. M. Mackiewicz, J. L. Rodgers, C. C. Fang, D. R. Billodeaux and J. H. Reibenspies, *Inorg. Chem.*, 2004, 43, 6024-6034

Experiment 1

Inside a glove box, catalyst 1 (23.13 mg, 0.0395 mmol) and cyclohexene oxide (4.00 mL, 39.53 mmol) were charged into a glass insert, which was placed into an autoclave. This autoclave was pressurized to 50 bar $CO_2$ and put into a preheated aluminum heating block at 40° C. The reaction mixture was stirred using a magnetic stirrer. After 22 hrs the reaction was stopped by cooling down the autoclave to room temperature and releasing the pressure.

Example 2

Inside a glove box, catalyst 1 (23.09 mg, 0.0395 mmol), CTA 5 (57.58 mg, 0.395 mmol) and cyclohexene oxide (4.00 mL, 39.53 mmol) were charged into a glass insert, which was placed into an autoclave. This autoclave was pressurized to 50 bar $CO_2$ and put into a preheated aluminum heating block at 40° C. The reaction mixture was stirred using a magnetic stirrer. After 22 hrs the reaction was stopped by cooling down the autoclave to room temperature and releasing the pressure.

Experiment 3

Experiment 3 was carried out similar to experiment 1, now using: catalyst 1 (23.21 mg, 0.397 mmol), CTA 6 (23 µL, 0.39 mmol) and cyclohexene oxide (4.00 mL, 39.53 mmol).

Example 4

Example 4 was carried out similar to experiment 1, now using: catalyst 1 (23.20 mg, 0.396 mmol), CTA 7 (54.62 mg, 0.395 mmol) and cyclohexene oxide (4.00 mL, 39.53 mmol).

Experiment 5

Experiment 5 was carried out similar to experiment 1, now using: catalyst 2 (18.66 mg, 0.395 mmol) and cyclohexene oxide (4.00 mL, 39.53 mmol).

Example 6

Example 6 was carried out similar to experiment 1, now using: catalyst 2 (18.70 mg, 0.396 mmol), CTA 5 (115.55 mg, 1.064 mmol) and cyclohexene oxide (4.00 mL, 39.53 mmol).

Experiment 7

Experiment 7 was carried out similar to experiment 1, now using: catalyst 2 (18.61 mg, 0.394 mmol), CTA 6 (23 µL, 0.39 mmol) and cyclohexene oxide (4.00 mL, 39.53 mmol).

Example 8

Example 8 was carried out similar to experiment 1, now using: catalyst 2 (18.65 mg, 0.395 mmol), CTA 7 (109.24 mg, 0.791 mmol) and cyclohexene oxide (4.00 mL, 39.53 mmol).

Experiment 9

Experiment 9 was carried out similar to experiment 1, now using: catalyst 3 (22.86 mg, 0.395 mmol), DMAP (9.63 mg, 0.788 mmol) and cyclohexene oxide (4.00 mL, 39.53 mmol).

Example 10

Example 10 was carried out similar to experiment 1, now using: catalyst 3 (22.80 mg, 0.394 mmol), DMAP (9.60 mg, 0.786 mmol), CTA 5 (231.12 mg, 1.581 mmol) and cyclohexene oxide (4.00 mL, 39.53 mmol).

Experiment 11

Inside a glove box, [EtBDI]ZnOEt (34.23 mg, 0.0725 mmol), limonene oxide (3 mL, 18.1 mmol) and toluene (1 mL) were charged into a glass insert, which was placed into an autoclave. This autoclave was pressurized to 6.6 bar $CO_2$ and put into a preheated aluminum heating block at 25° C. The reaction mixture was stirred using a magnetic stirrer. After 69 hrs the reaction was stopped by cooling down the autoclave to room temperature and releasing the pressure.

Example 12

Inside a glove box, [EtBDI]ZnOEt (34.20 mg, 0.0725 mmol), isoidide (105.9 mg, 0.725 mmol), limonene oxide (3 mL, 18.1 mmol) and toluene (1 mL) were charged into a glass insert, which was placed into an autoclave. This autoclave was pressurized to 6.6 bar $CO_2$ and put into a preheated aluminum heating block at 25° C. The reaction mixture was stirred using a magnetic stirrer. After 69 hrs the reaction was stopped by cooling down the autoclave to room temperature and releasing the pressure.

Analyses:

SEC analysis was carried out using a Waters GPC apparatus equipped with a Waters 510 pump and a Waters 410 refractive index detector (at 40° C.). Injections were done by a Waters WISP 712 auto injector with an injection volume of 50 µL. Two linear columns, Mixed C, Polymer Laboratories, 30 cm, 40° C., were used. Tetrahydrofuran was used as eluent at a flow rate of 1.0 mL/min. Calibration curves were obtained using polystyrene standards (Polymer Laboratories, M=580 g/mol to M=7.1×10$^6$ g/mol). Data acquisition and processing were performed using WATERS Millennium32 (v3.2 or 4.0) software. MALDI-ToF-MS measurements were performed on a Voyager DE-STR from Applied Biosystems. Calibrations were carried out with poly(ethylene oxide) standards for the lower mass range and polystyrene standards for the higher mass range. The mass accuracy was better than 0.2 Dalton, the mass resolution was approximately m/z 12,000. DCTB (trans-2-[3-(4-tert-butylphenyl)-2-methyl-2-propenylidene] malononitrile) was used as matrix. Potassium trifluoroacetate (Aldrich, >99%) was used as cationization agent. Solutions of the matrix (40 mg/mL), potassium trifluoroacetate (5 mg/mL) and the polyester sample (1 mg/mL) in THF were premixed in a ratio of 5:1:5. The mixture was subsequently hand-spotted on the target and left to dry. Spectra were recorded in reflector mode at positive polarity. Endgroup determination has been performed with MALDI-ToF-MS and is only qualitative.

Results

| Exp | cat | CTA | mon/cat | CTA/cat | T (°C.) | p(CO$_2$) (bar) | t (hrs) | Mn (g/mol) | Mw (g/mol) | PDI (-) | end groups by MALDI-ToF-MS |
|---|---|---|---|---|---|---|---|---|---|---|---|
| CE 1 | 1 | — | 1000 | — | 40 | 50 | 22 | 3270/7501 | 3601/7850 | 1.1/1.1 | —OH, —Cl |
| 2 | 1 | 5 | 1000 | 10 | 40 | 50 | 22 | 937 | 1104 | 1.2 | -Isoidide |
| CE 3 | 1 | 6 | 1000 | 10 | 40 | 50 | 22 | 686 | 860 | 1.2 | —OEt |
| 4 | 1 | 7 | 1000 | 10 | 40 | 50 | 22 | 555 | 596 | 1.1 | -1,4-Benzenedimethanol |
| CE 5 | 2 | — | 1000 | — | 50 | 7 | 16 | 19380 | 55714 | 2.9 | —OEt |
| 6 | 2 | 5 | 1000 | 20 | 50 | 50 | 65 | 481 | 529 | 1.1 | -Isoidide |
| CE 7 | 2 | 6 | 1000 | 10 | 50 | 7 | 16 | 11604 | 41339 | 3.6 | —OEt + —OC$_6$H$_{9/11}$ |
| 8 | 2 | 7 | 1000 | 20 | 50 | 50 | 65 | 437 | 486 | 1.1 | -1,4-Benzenedimethanol |
| CE 9 | 3 | — | 1000 | — | 60 | 50 | 19 | 6800 | 12121 | 1.8 | -DMAP/—OH, -H/—OH |
| 10 | 3 | 5 | 1000 | 40 | 60 | 50 | 19 | 845 | 1060 | 1.3 | -Isoidide, —OH |
| CE 11 | 2 | — | 250 | — | 25 | 7 | 69 | 1455 | 1886 | 1.3 | OEt, —OH |
| 12 | 2 | 5 | 250 | 10 | 25 | 7 | 69 | 989 | 1294 | 1.3 | -Isoidide, —OH |

CE = comparative experiment
CTAs:
5: Isoidide
6: EtOH
7: 1,4-Benzenedimethanol
Catalysts:
1: [salen] CoCl

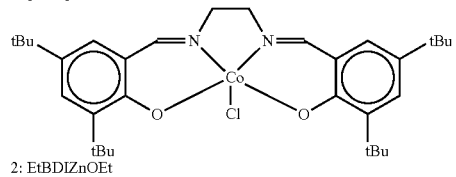

2: EtBDIZnOEt

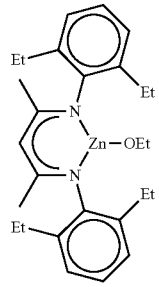

3: [salen] CrCl + DMAP (cocatalyst([cocat]:[cat] = 2))

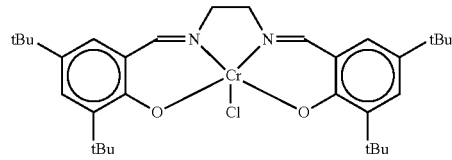

The invention claimed is:

1. A process for the preparation of a polycarbonate which comprises reacting an oxirane and CO$_2$ in a single step in the presence of a difunctional chain transfer agent which is at least one selected from the group consisting of ether diols, aromatic diols and bicyclic ether diols.

2. The process according to claim 1, wherein the chain transfer agent is a bicyclic ether diol selected from the group consisting of isosorbide, isomannide and isoidide.

3. The process according to claim 1, wherein the chain transfer agent is a mixture comprising at least one diol and at least one polyol having from 3 to 6 OH-groups.

4. The process according to claim 3, wherein the mixture has a weight ratio of the at least one diol to the at least one polyol which ranges between 4 and 50.

5. The process according to claim 1, wherein the oxirane is an oxiranes are chosen from aliphatic or aromatics oxirane.

6. The process according to claim 1, wherein the polycarbonate is an OH-functionalized polycarbonate.

7. The process according to claim 6, wherein the OH-functionalized polycarbonate comprises between 0.3 and 2 mmol hydroxyl groups per gram of polymer.

8. A coating composition comprising the Polycarbonate obtained by the process according to claim 1.

9. The coating composition according to claim 8, wherein the coating composition is in the form of a powder coating, solvent bone coating or a water borne coating.

* * * * *